(12) United States Patent
Matsuhira

(10) Patent No.: US 8,718,392 B2
(45) Date of Patent: May 6, 2014

(54) METHOD, PROGRAM, AND DEVICE FOR COMPRESSING A BLOCK OF IMAGE DATA BASED ON WHETHER THE BLOCK IS MONOCHROMATIC

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 611 days.

(21) Appl. No.: 12/914,112

(22) Filed: Oct. 28, 2010

(65) Prior Publication Data

US 2011/0096985 A1    Apr. 28, 2011

(30) Foreign Application Priority Data

Oct. 28, 2009    (JP) ................................ 2009-247883

(51) Int. Cl.
*G06K 9/46*    (2006.01)
(52) U.S. Cl.
USPC .......................................................... 382/239
(58) Field of Classification Search
None
See application file for complete search history.

(56) References Cited

U.S. PATENT DOCUMENTS

| | | | | |
|---|---|---|---|---|
| 5,046,119 A | * | 9/1991 | Hoffert et al. | 382/166 |
| 5,383,037 A | * | 1/1995 | Kimura et al. | 358/539 |
| 5,644,406 A | * | 7/1997 | Harrington et al. | 382/239 |
| 5,768,434 A | * | 6/1998 | Ran | 382/240 |
| 5,818,969 A | * | 10/1998 | Astle | 382/236 |
| 5,917,962 A | * | 6/1999 | Chen et al. | 382/291 |
| 6,115,496 A | * | 9/2000 | Nguyen et al. | 382/166 |
| 6,118,552 A | * | 9/2000 | Suzuki et al. | 382/166 |
| 6,373,890 B1 | * | 4/2002 | Freeman | 375/240 |
| 6,597,815 B1 | | 7/2003 | Satoh et al. | |
| 6,628,419 B1 | | 9/2003 | So et al. | |
| 6,693,721 B1 | | 2/2004 | Suzuki | |
| 7,046,387 B1 | * | 5/2006 | Yagishita et al. | 358/1.16 |
| 2005/0100232 A1 | | 5/2005 | Sakanashi et al. | |
| 2006/0114480 A1 | * | 6/2006 | Chang et al. | 358/1.9 |
| 2006/0132855 A1 | * | 6/2006 | Dokuni et al. | 358/448 |
| 2007/0116367 A1 | | 5/2007 | Yamamoto | |
| 2007/0183675 A1 | | 8/2007 | Morohashi | |
| 2008/0253647 A1 | * | 10/2008 | Cho et al. | 382/164 |
| 2009/0161975 A1 | | 6/2009 | Asai et al. | |
| 2009/0310873 A1 | * | 12/2009 | Asano | 382/232 |
| 2010/0098333 A1 | | 4/2010 | Aoyagi | |
| 2011/0116712 A1 | | 5/2011 | Matsuhira | |

FOREIGN PATENT DOCUMENTS

| | | | | | |
|---|---|---|---|---|---|
| JP | 09051441 A | * | 2/1997 | | H04N 1/41 |
| JP | 09186866 A | * | 7/1997 | | H04N 1/40 |
| JP | 2000-125136 A | | 4/2000 | | |
| JP | 2000-148996 A | | 5/2000 | | |
| JP | 2000-263856 A | | 9/2000 | | |
| JP | 2001145107 A | * | 5/2001 | | H04N 7/30 |
| JP | 2004-080387 A | | 3/2004 | | |

OTHER PUBLICATIONS

JPEG JFIF, http://www.w3.org/Graphics/JPEG/, W3C, Feb. 13, 1996.

\* cited by examiner

*Primary Examiner* — Wenpeng Chen
(74) *Attorney, Agent, or Firm* — Nutter McClennen & Fish LLP; John J. Penny, Jr.; Michael P. Visconti, III

(57) ABSTRACT

An image processing method is disclosed that includes dividing image data into a plurality of blocks, determining whether each block is color or monochrome, and compressing the block of image data based on the determination as to whether the block is color or monochrome.

10 Claims, 11 Drawing Sheets

FIG. 4

| | DC | LOW | | AC | | | HIGH |
|---|---|---|---|---|---|---|---|
| DC | 16 | 11 | 10 | 16 | 24 | 40 | 51 | 61 |
| LOW | 12 | 12 | 14 | 19 | 26 | 58 | 60 | 55 |
| | 14 | 13 | 16 | 24 | 40 | 57 | 69 | 56 |
| | 14 | 17 | 22 | 29 | 51 | 87 | 80 | 62 |
| AC | 18 | 22 | 37 | 56 | 68 | 109 | 103 | 77 |
| | 24 | 35 | 55 | 64 | 81 | 104 | 113 | 92 |
| | 49 | 64 | 78 | 87 | 103 | 121 | 121 | 101 |
| HIGH | 72 | 92 | 95 | 98 | 112 | 100 | 103 | 99 |

*Note: FIG. 4 table shows 8 columns of data; DC column, then LOW, then AC spanning multiple, then HIGH.*

FIG. 5

| | DC | LOW | | AC | | | HIGH |
|---|---|---|---|---|---|---|---|
| DC | 17 | 18 | 24 | 47 | 99 | 99 | 99 | 99 |
| LOW | 18 | 21 | 26 | 66 | 99 | 99 | 99 | 99 |
| | 24 | 26 | 56 | 99 | 99 | 99 | 99 | 99 |
| | 47 | 66 | 99 | 99 | 99 | 99 | 99 | 99 |
| AC | 99 | 99 | 99 | 99 | 99 | 99 | 99 | 99 |
| | 99 | 99 | 99 | 99 | 99 | 99 | 99 | 99 |
| | 99 | 99 | 99 | 99 | 99 | 99 | 99 | 99 |
| HIGH | 99 | 99 | 99 | 99 | 99 | 99 | 99 | 99 |

FIG. 6

| RRRR | SSSS | CODE LENGTH | HUFFMAN CODE | RRRR | SSSS | CODE LENGTH | HUFFMAN CODE | RRRR | SSSS | CODE LENGTH | HUFFMAN CODE |
|------|------|-------------|--------------|------|------|-------------|--------------|------|------|-------------|--------------|
| 0000 | 0000 | 4  | 000A | 0101 | 0001 | 7  | 007A | 1010 | 0001 | 9  | 01FA |
| 0000 | 0001 | 2  | 0000 | 0101 | 0010 | 11 | 07F7 | 1010 | 0010 | 16 | FFC7 |
| 0000 | 0010 | 2  | 0001 | 0101 | 0011 | 16 | FF9E | 1010 | 0011 | 16 | FFC8 |
| 0000 | 0011 | 3  | 0004 | 0101 | 0100 | 16 | FF9F | 1010 | 0100 | 16 | FFC9 |
| 0000 | 0100 | 4  | 000B | 0101 | 0101 | 16 | FFA0 | 1010 | 0101 | 16 | FFCA |
| 0000 | 0101 | 5  | 001A | 0101 | 0110 | 16 | FFA1 | 1010 | 0110 | 16 | FFCB |
| 0000 | 0110 | 7  | 0078 | 0101 | 0111 | 16 | FFA2 | 1010 | 0111 | 16 | FFCC |
| 0000 | 0111 | 8  | 00F8 | 0101 | 1000 | 16 | FFA3 | 1010 | 1000 | 16 | FFCD |
| 0000 | 1000 | 10 | 03F6 | 0101 | 1001 | 16 | FFA4 | 1010 | 1001 | 16 | FFCE |
| 0000 | 1001 | 16 | FF82 | 0101 | 1010 | 16 | FFA5 | 1010 | 1010 | 16 | FFCF |
| 0000 | 1010 | 16 | FF83 | 0110 | 0001 | 7  | 007B | 1011 | 0001 | 10 | 03F9 |
| 0001 | 0001 | 4  | 000C | 0110 | 0010 | 12 | 0FF6 | 1011 | 0010 | 16 | FFD0 |
| 0001 | 0010 | 5  | 001B | 0110 | 0011 | 16 | FFA6 | 1011 | 0011 | 16 | FFD1 |
| 0001 | 0011 | 7  | 0079 | 0110 | 0100 | 16 | FFA7 | 1011 | 0100 | 16 | FFD2 |
| 0001 | 0100 | 9  | 01F6 | 0110 | 0101 | 16 | FFA8 | 1011 | 0101 | 16 | FFD3 |
| 0001 | 0101 | 11 | 07F6 | 0110 | 0110 | 16 | FFA9 | 1011 | 0110 | 16 | FFD4 |
| 0001 | 0110 | 16 | FF84 | 0110 | 0111 | 16 | FFAA | 1011 | 0111 | 16 | FFD5 |
| 0001 | 0111 | 16 | FF85 | 0110 | 1000 | 16 | FFAB | 1011 | 1000 | 16 | FFD6 |
| 0001 | 1000 | 16 | FF86 | 0110 | 1001 | 16 | FFAC | 1011 | 1001 | 16 | FFD7 |
| 0001 | 1001 | 16 | FF87 | 0110 | 1010 | 16 | FFAD | 1011 | 1010 | 16 | FFD8 |
| 0001 | 1010 | 16 | FF88 | 0111 | 0001 | 8  | 00FA | 1100 | 0001 | 10 | 03FA |
| 0010 | 0001 | 5  | 001C | 0111 | 0010 | 12 | 0FF7 | 1100 | 0010 | 16 | FFD9 |
| 0010 | 0010 | 8  | 00F9 | 0111 | 0011 | 16 | FFAE | 1100 | 0011 | 16 | FFDA |
| 0010 | 0011 | 10 | 03F7 | 0111 | 0100 | 16 | FFAF | 1100 | 0100 | 16 | FFDB |
| 0010 | 0100 | 12 | 0FF4 | 0111 | 0101 | 16 | FFB0 | 1100 | 0101 | 16 | FFDC |
| 0010 | 0101 | 16 | FF89 | 0111 | 0110 | 16 | FFB1 | 1100 | 0110 | 16 | FFDD |
| 0010 | 0110 | 16 | FF8A | 0111 | 0111 | 16 | FFB2 | 1100 | 0111 | 16 | FFDE |
| 0010 | 0111 | 16 | FF8B | 0111 | 1000 | 16 | FFB3 | 1100 | 1000 | 16 | FFDF |
| 0010 | 1000 | 16 | FF8C | 0111 | 1001 | 16 | FFB4 | 1100 | 1001 | 16 | FFE0 |
| 0010 | 1001 | 16 | FF8D | 0111 | 1010 | 16 | FFB5 | 1100 | 1010 | 16 | FFE1 |
| 0010 | 1010 | 16 | FF8E | 1000 | 0001 | 9  | 01F8 | 1101 | 0001 | 11 | 07F8 |
| 0011 | 0001 | 6  | 003A | 1000 | 0010 | 15 | 7FC0 | 1101 | 0010 | 16 | FFE2 |
| 0011 | 0010 | 9  | 01F7 | 1000 | 0011 | 16 | FFB6 | 1101 | 0011 | 16 | FFE3 |
| 0011 | 0011 | 12 | 0FF5 | 1000 | 0100 | 16 | FFB7 | 1101 | 0100 | 16 | FFE4 |
| 0011 | 0100 | 16 | FF8F | 1000 | 0101 | 16 | FFB8 | 1101 | 0101 | 16 | FFE5 |
| 0011 | 0101 | 16 | FF90 | 1000 | 0110 | 16 | FFB9 | 1101 | 0110 | 16 | FFE6 |
| 0011 | 0110 | 16 | FF91 | 1000 | 0111 | 16 | FFBA | 1101 | 0111 | 16 | FFE7 |
| 0011 | 0111 | 16 | FF92 | 1000 | 1000 | 16 | FFBB | 1101 | 1000 | 16 | FFE8 |
| 0011 | 1000 | 16 | FF93 | 1000 | 1001 | 16 | FFBC | 1101 | 1001 | 16 | FFE9 |
| 0011 | 1001 | 16 | FF94 | 1000 | 1010 | 16 | FFBD | 1101 | 1010 | 16 | FFEA |
| 0011 | 1010 | 16 | FF95 | 1001 | 0001 | 9  | 01F9 | 1110 | 0001 | 16 | FFEB |
| 0100 | 0001 | 6  | 003B | 1001 | 0010 | 16 | FFBE | 1110 | 0010 | 16 | FFEC |
| 0100 | 0010 | 10 | 03F8 | 1001 | 0011 | 16 | FFBF | 1110 | 0011 | 16 | FFED |
| 0100 | 0011 | 16 | FF96 | 1001 | 0100 | 16 | FFC0 | 1110 | 0100 | 16 | FFEE |
| 0100 | 0100 | 16 | FF97 | 1001 | 0101 | 16 | FFC1 | 1110 | 0101 | 16 | FFEF |
| 0100 | 0101 | 16 | FF98 | 1001 | 0110 | 16 | FFC2 | 1110 | 0110 | 16 | FFF0 |
| 0100 | 0110 | 16 | FF99 | 1001 | 0111 | 16 | FFC3 | 1110 | 0111 | 16 | FFF1 |
| 0100 | 0111 | 16 | FF9A | 1001 | 1000 | 16 | FFC4 | 1110 | 1000 | 16 | FFF2 |
| 0100 | 1000 | 16 | FF9B | 1001 | 1001 | 16 | FFC5 | 1110 | 1001 | 16 | FFF3 |
| 0100 | 1001 | 16 | FF9C | 1001 | 1010 | 16 | FFC6 | 1110 | 1010 | 16 | FFF4 |
| 0100 | 1010 | 16 | FF9D |      |      |    |      | 1111 | 0000 | 11 | 07F9 |
|      |      |    |      |      |      |    |      | 1111 | 0001 | 16 | FFF5 |
|      |      |    |      |      |      |    |      | 1111 | 0010 | 16 | FFF6 |
|      |      |    |      |      |      |    |      | 1111 | 0011 | 16 | FFF7 |
|      |      |    |      |      |      |    |      | 1111 | 0100 | 16 | FFF8 |

FIG. 7

| RRRR | SSSS | CODE LENGTH | HUFFMAN CODE | RRRR | SSSS | CODE LENGTH | HUFFMAN CODE | RRRR | SSSS | CODE LENGTH | HUFFMAN CODE |
|---|---|---|---|---|---|---|---|---|---|---|---|
| 0000 | 0000 | 2 | 0000 | 0101 | 0001 | 6 | 003B | 1010 | 0001 | 9 | 01F8 |
| 0000 | 0001 | 2 | 0001 | 0101 | 0010 | 10 | 03F9 | 1010 | 0010 | 16 | FFC9 |
| 0000 | 0010 | 3 | 0004 | 0101 | 0011 | 16 | FF9F | 1010 | 0011 | 16 | FFCA |
| 0000 | 0011 | 4 | 000A | 0101 | 0100 | 16 | FFA0 | 1010 | 0100 | 16 | FFCB |
| 0000 | 0100 | 5 | 0018 | 0101 | 0101 | 16 | FFA1 | 1010 | 0101 | 16 | FFCC |
| 0000 | 0101 | 5 | 0019 | 0101 | 0110 | 16 | FFA2 | 1010 | 0110 | 16 | FFCD |
| 0000 | 0110 | 6 | 0038 | 0101 | 0111 | 16 | FFA3 | 1010 | 0111 | 16 | FFCE |
| 0000 | 0111 | 7 | 0078 | 0101 | 1000 | 16 | FFA4 | 1010 | 1000 | 16 | FFCF |
| 0000 | 1000 | 9 | 01F4 | 0101 | 1001 | 16 | FFA5 | 1010 | 1001 | 16 | FFD0 |
| 0000 | 1001 | 10 | 03F6 | 0101 | 1010 | 16 | FFA6 | 1010 | 1010 | 16 | FFD1 |
| 0000 | 1010 | 12 | 0FF4 | 0110 | 0001 | 7 | 0079 | 1011 | 0001 | 9 | 01F9 |
| 0001 | 0001 | 4 | 000B | 0110 | 0010 | 11 | 07F7 | 1011 | 0010 | 16 | FFD2 |
| 0001 | 0010 | 6 | 0039 | 0110 | 0011 | 16 | FFA7 | 1011 | 0011 | 16 | FFD3 |
| 0001 | 0011 | 8 | 00F6 | 0110 | 0100 | 16 | FFA8 | 1011 | 0100 | 16 | FFD4 |
| 0001 | 0100 | 9 | 01F5 | 0110 | 0101 | 16 | FFA9 | 1011 | 0101 | 16 | FFD5 |
| 0001 | 0101 | 11 | 07F6 | 0110 | 0110 | 16 | FFAA | 1011 | 0110 | 16 | FFD6 |
| 0001 | 0110 | 12 | 0FF5 | 0110 | 0111 | 16 | FFAB | 1011 | 0111 | 16 | FFD7 |
| 0001 | 0111 | 16 | FF88 | 0110 | 1000 | 16 | FFAC | 1011 | 1000 | 16 | FFD8 |
| 0001 | 1000 | 16 | FF89 | 0110 | 1001 | 16 | FFAD | 1011 | 1001 | 16 | FFD9 |
| 0001 | 1001 | 16 | FF8A | 0110 | 1010 | 16 | FFAE | 1011 | 1010 | 16 | FFDA |
| 0001 | 1010 | 16 | FF8B | 0111 | 0001 | 7 | 007A | 1100 | 0001 | 9 | 01FA |
| 0010 | 0001 | 5 | 001A | 0111 | 0010 | 11 | 07F8 | 1100 | 0010 | 16 | FFDB |
| 0010 | 0010 | 8 | 00F7 | 0111 | 0011 | 16 | FFAF | 1100 | 0011 | 16 | FFDC |
| 0010 | 0011 | 10 | 03F7 | 0111 | 0100 | 16 | FFB0 | 1100 | 0100 | 16 | FFDD |
| 0010 | 0100 | 12 | 0FF6 | 0111 | 0101 | 16 | FFB1 | 1100 | 0101 | 16 | FFDE |
| 0010 | 0101 | 15 | 7FC2 | 0111 | 0110 | 16 | FFB2 | 1100 | 0110 | 16 | FFDF |
| 0010 | 0110 | 16 | FF8C | 0111 | 0111 | 16 | FFB3 | 1100 | 0111 | 16 | FFE0 |
| 0010 | 0111 | 16 | FF8D | 0111 | 1000 | 16 | FFB4 | 1100 | 1000 | 16 | FFE1 |
| 0010 | 1000 | 16 | FF8E | 0111 | 1001 | 16 | FFB5 | 1100 | 1001 | 16 | FFE2 |
| 0010 | 1001 | 16 | FF8F | 0111 | 1010 | 16 | FFB6 | 1100 | 1010 | 16 | FFE3 |
| 0010 | 1010 | 16 | FF90 | 1000 | 0001 | 8 | 00F9 | 1101 | 0001 | 11 | 07F9 |
| 0011 | 0001 | 5 | 001B | 1000 | 0010 | 16 | FFB7 | 1101 | 0010 | 16 | FFE4 |
| 0011 | 0010 | 8 | 00F8 | 1000 | 0011 | 16 | FFB8 | 1101 | 0011 | 16 | FFE5 |
| 0011 | 0011 | 10 | 03F8 | 1000 | 0100 | 16 | FFB9 | 1101 | 0100 | 16 | FFE6 |
| 0011 | 0100 | 12 | 0FF7 | 1000 | 0101 | 16 | FFBA | 1101 | 0101 | 16 | FFE7 |
| 0011 | 0101 | 16 | FF91 | 1000 | 0110 | 16 | FFBB | 1101 | 0110 | 16 | FFE8 |
| 0011 | 0110 | 16 | FF92 | 1000 | 0111 | 16 | FFBC | 1101 | 0111 | 16 | FFE9 |
| 0011 | 0111 | 16 | FF93 | 1000 | 1000 | 16 | FFBD | 1101 | 1000 | 16 | FFEA |
| 0011 | 1000 | 16 | FF94 | 1000 | 1001 | 16 | FFBE | 1101 | 1001 | 16 | FFEB |
| 0011 | 1001 | 16 | FF95 | 1000 | 1010 | 16 | FFBF | 1101 | 1010 | 16 | FFEC |
| 0011 | 1010 | 16 | FF96 | 1001 | 0001 | 9 | 01F7 | 1110 | 0001 | 14 | 3FE0 |
| 0100 | 0001 | 6 | 003A | 1001 | 0010 | 16 | FFC0 | 1110 | 0010 | 16 | FFED |
| 0100 | 0010 | 9 | 01F6 | 1001 | 0011 | 16 | FFC1 | 1110 | 0011 | 16 | FFEE |
| 0100 | 0011 | 16 | FF97 | 1001 | 0100 | 16 | FFC2 | 1110 | 0100 | 16 | FFEF |
| 0100 | 0100 | 16 | FF98 | 1001 | 0101 | 16 | FFC3 | 1110 | 0101 | 16 | FFF0 |
| 0100 | 0101 | 16 | FF99 | 1001 | 0110 | 16 | FFC4 | 1110 | 0110 | 16 | FFF1 |
| 0100 | 0110 | 16 | FF9A | 1001 | 0111 | 16 | FFC5 | 1110 | 0111 | 16 | FFF2 |
| 0100 | 0111 | 16 | FF9B | 1001 | 1000 | 16 | FFC6 | 1110 | 1000 | 16 | FFF3 |
| 0100 | 1000 | 16 | FF9C | 1001 | 1001 | 16 | FFC7 | 1110 | 1001 | 16 | FFF4 |
| 0100 | 1001 | 16 | FF9D | 1001 | 1010 | 16 | FFC8 | 1110 | 1010 | 16 | FFF5 |
| 0100 | 1010 | 16 | FF9E | | | | | 1111 | 0000 | 10 | 03FA |
| | | | | | | | | 1111 | 0001 | 15 | 7FC3 |
| | | | | | | | | 1111 | 0010 | 16 | FFF6 |
| | | | | | | | | 1111 | 0011 | 16 | FFF7 |
| | | | | | | | | 1111 | 0100 | 16 | FFF8 |

FIG. 8

| SSSS | CODE LENGTH | HUFFMAN CODE |
|------|-------------|--------------|
| 0000 | 2 | 0000 |
| 0001 | 3 | 0002 |
| 0010 | 3 | 0003 |
| 0011 | 3 | 0004 |
| 0100 | 3 | 0005 |
| 0101 | 3 | 0006 |
| 0110 | 4 | 000E |
| 0111 | 5 | 001E |
| 1000 | 6 | 003E |
| 1001 | 7 | 007E |
| 1010 | 8 | 00FE |
| 1011 | 9 | 01FE |
| 1100 | 10 | 03FE |
| 1101 | 11 | 07FE |
| 1110 | 12 | 0FFE |
| 1111 | 13 | 1FFE |

FIG. 9

| SSSS | CODE LENGTH | HUFFMAN CODE |
|------|-------------|--------------|
| 0000 | 2 | 0000 |
| 0001 | 2 | 0001 |
| 0010 | 2 | 0002 |
| 0011 | 3 | 0006 |
| 0100 | 4 | 000E |
| 0101 | 5 | 001E |
| 0110 | 6 | 003E |
| 0111 | 7 | 007E |
| 1000 | 8 | 00FE |
| 1001 | 9 | 01FE |
| 1010 | 10 | 03FE |
| 1011 | 11 | 07FE |
| 1100 | 12 | 0FFE |
| 1101 | 13 | 1FFE |
| 1110 | 14 | 3FFE |
| 1111 | 15 | 7FFE |

METHOD, PROGRAM, AND DEVICE FOR COMPRESSING A BLOCK OF IMAGE DATA BASED ON WHETHER THE BLOCK IS MONOCHROMATIC

BACKGROUND

1. Technical Field

The present invention relates to an image processing method, a program, and an image processing device.

2. Related Art

As a technique for compressing image data, techniques for compressing image data using the Joint Photographic Experts Group (JPEG) compression format have been proposed (for example, refer to JPEG JFIF).

When image data includes a monochrome image portion (such as a black character) and a color image portion and is regarded entirely as a color image, and the resolution of the image data is reduced, and the image data is compressed using the compression format, the image data can be compressed at a relatively high compression rate. In this case, however, while the resolution of the color image portion is reduced, the resolution of the monochrome image portion (such as a black character) is also reduced.

SUMMARY

An advantage of some aspects of the invention is that it provides an image processing method, a program and an image processing device, which allow image data to be appropriately compressed.

The advantage can be achieved by the following aspects.

According to a first aspect of the invention, an image processing method for dividing image data into a plurality of blocks and compressing the blocks on a block basis includes: sequentially selecting a block to be compressed from among the plurality of blocks and acquiring the selected block; determining whether the acquired block is color or monochrome; and when it is determined that the acquired block is color, generating a predetermined number of units of color components of a predetermined color format and performing a compression process using the predetermined number of units of the color components and a table for color image data, and when it is determined that the acquired block is monochrome, generating a predetermined number of units of one color component of the predetermined color format while dividing the acquired block, and performing a compression process using the generated units of the one color component and a table for monochrome image data.

In the image processing method according to the first aspect of the invention, the image data is divided into the plurality of blocks, and the blocks are compressed on a block basis. A block to be compressed is sequentially selected from among the plurality of blocks and acquired. It is determined whether the acquired block is color or monochrome. When it is determined that the acquired block is color, the predetermined number of units of the color components of the predetermined color format are generated, and the compression process is performed using the predetermined number of units of the color components and the table for color image data. When it is determined that the acquired block is monochrome, the predetermined number of units of the one color component of the predetermined color format are generated while the acquired block is divided. Then, the compression process is performed using the predetermined number of units of the one color component and the table for monochrome image data. Thus, the compression process can be appropriately performed on the basis of whether the block is color or monochrome, and the image data can be appropriately compressed. It is assumed that the number of pixels (e.g., 8 pixels (arranged in a vertical direction)×8 pixels (arranged in a horizontal direction)) included in the color block is equal to the number of pixels included in the monochrome block. In this assumption, the resolution of the color block is reduced to a value lower than the resolution of the monochrome block. Then, the compression process is performed on the color block. Thus, the color block can be compressed at a high compression rate. The monochrome block can be compressed while the resolution of the monochrome block is higher than the resolution of the color block. This is due to the fact that in consideration of human visual characteristics, it is less likely that a relatively high resolution is required for color blocks and highly likely that a relatively high resolution is required for monochrome blocks such as black characters.

According to a second aspect of the invention, in the image processing method according to the first aspect, it is preferable that when it is determined that the acquired block is color, the predetermined number of units of the color components be generated while the resolution of the units of the color components is reduced, and when it is determined that the acquired block is monochrome, the predetermined number of units of the one color component be generated while the resolution of the units of the one color component is maintained. In this case, when image data that includes a color block and a monochrome block is to be compressed, the image data can be compressed while the resolution of the monochrome block is maintained.

According to a third aspect of the invention, in the image processing method according to the first aspect, it is preferable that when it is determined that the acquired block is color, four units of the color components of the predetermined color format be generated, and when it is determined that the acquired block is monochrome, four units of the one component of the predetermined color format be generated while the acquired block is divided along center lines of the acquired block, one of the center lines extending in a vertical direction of the acquired block, the other center line extending in a horizontal direction of the acquired block. According to a fourth aspect of the invention, in the image processing method according to the first aspect, it is preferable that when it is determined that the acquired block is color, four units of the color components of the predetermined color format be generated, and when it is determined that the acquired block is monochrome, four units of the one component of the predetermined color format be generated while a half of the acquired block is divided according to a first method and the other half of the acquired block is divided according to a second method that is different from the first method. According to a fifth aspect of the invention, in the image processing method according to the fourth aspect, it is preferable that when it is determined that the acquired block is monochrome, an upper half of the acquired block be divided along a center line of the upper half of the acquired block into first and second units, and a lower half of the acquired block be divided into third and fourth units, the center line of the upper half of the acquired block extending in a vertical direction of the acquired block, the third unit being formed by combining odd columns of pixels included in the lower half of the acquired block, the fourth unit being formed by combining even columns of pixels included in the lower half of the acquired block.

According to a sixth aspect of the invention, in the image processing method according to the first aspect, it is preferable that when it is determined that the acquired block is color, two units of an Y component of YCbCr format, one unit of a Cb component of YCbCr format, and one unit of a Cr component of YCbCr format be generated, and when it is determined that the acquired block is monochrome, four units of the Y component be generated while the acquired block is divided.

According to a seventh aspect of the invention, in the image processing method according to the first aspect, it is preferable that when it is determined that the acquired block is color and it is determined that a previously acquired block is color, the table for color image data be not switched to the table for monochrome image data, and when it is determined that the acquired block is monochrome and it is determined that the previously acquired block is monochrome, the table for monochrome image data be not switched to the table for color image data.

According to a eighth aspect of the invention, in the image processing method according to the first aspect, it is preferable that it be determined whether the acquired block is color or monochrome by comparing RGB values of the acquired block in RGB format. According to a ninth aspect of the invention, in the image processing method according to the first aspect, it is preferable that it be determined whether the acquired block is color or monochrome after predetermined black separation is performed on the acquired block.

According to a tenth aspect of the invention, a program causes a computer to perform the image processing method according to the first aspect of the invention. In this case, the program may be stored in a storage medium (e.g., hard disk, ROM, FD, CD, DVD or the like) from which the computer is capable of reading the program. The program may be delivered from a certain computer to another computer through a transmission medium (communication network such as the Internet or a LAN). The computer may receive the program by any method. The image processing method according to the first aspect of the invention is performed by causing one computer to execute the program or causing a plurality of computers to each perform at least one of the selection and acquisition (in the image processing method), the determination (in the image processing method), and the generation and compression (in the image processing method). Thus, an effect that is the same as or similar to the effects obtained by the image processing method according to the first aspect of the invention can be obtained.

According to an eleventh aspect of the invention, an image processing device includes: an acquiring section that sequentially selects a block to be compressed from among a plurality of blocks obtained by dividing image data and acquires the selected block; a determining section that determines whether the acquired block is color or monochrome; and a compressing section that generates, when the determining section determines that the acquired block is color, a predetermined number of units of color components of a predetermined color format and performs a compression process using the generated units of the color components and a table for color image data, and that generates, when the determining section determines that the acquired block is monochrome, a predetermined number of units of one color component of the predetermined color format while dividing the acquired block and performs a compression process using the generated units of the one color component and a table for monochrome image data.

The image processing device according to the eleventh aspect of the invention divides the image data into the plurality of blocks and compresses the blocks on a block basis. The image processing device sequentially selects a block to be compressed from among the plurality of blocks and acquires the selected block. The image processing device determines whether the acquired block is color or monochrome. When the image processing device determines that the acquired block is color, the image processing device generates the predetermined number of units of the color components of the predetermined color format and performs the compression process using the generated units of the color components and the table for color image data. When the image processing device determines that the acquired block is monochrome, the image processing device generates the predetermined number of units of the one color component of the predetermined color format while dividing the acquired block. The image processing device performs the compression process using the generated units of the color component and the table for monochrome image data. Thus, the image processing device is capable of appropriately performing the compression process on the basis of whether the block is color or monochrome and appropriately compressing the image data. It is assumed that the number of pixels (e.g., 8 pixels (arranged in a vertical direction)×8 pixels (arranged in a horizontal direction)) included in the color block to be subjected to the compression process is equal to the number of pixels (e.g., 8 pixels (arranged in the vertical direction)×8 pixels (arranged in the horizontal direction)) included in the monochrome block to be subjected to the compression process. In this assumption, the resolution of the color block is reduced to a value that is lower than the resolution of the monochrome block, and the compression process is performed on the color block. Thus, the color block can be compressed at a high compression rate. The monochrome block can be compressed while the resolution of the monochrome block is higher than the resolution of the color block.

BRIEF DESCRIPTION OF THE DRAWINGS

The invention will be described with reference to the accompanying drawings, wherein like numbers reference like elements.

FIG. 4 is a diagram illustrating an example of a quantization table for the Yc1 and Yc2 units.

FIG. 5 is a diagram illustrating an example of a quantization table for the Cb and Cr units.

FIG. 6 is a diagram illustrating an example of an AC Huffman table for the Yc1 and Yc2 units.

FIG. 7 is a diagram illustrating an example of an AC Huffman table for the Cb and Cr units.

FIG. 8 is a diagram illustrating an example of a DC Huffman table for the Yc1 and Yc2 units.

FIG. 9 is a diagram illustrating an example of a DC Huffman table for the Cb and Cr units.

DESCRIPTION OF EXEMPLARY EMBODIMENTS

Figure 1:
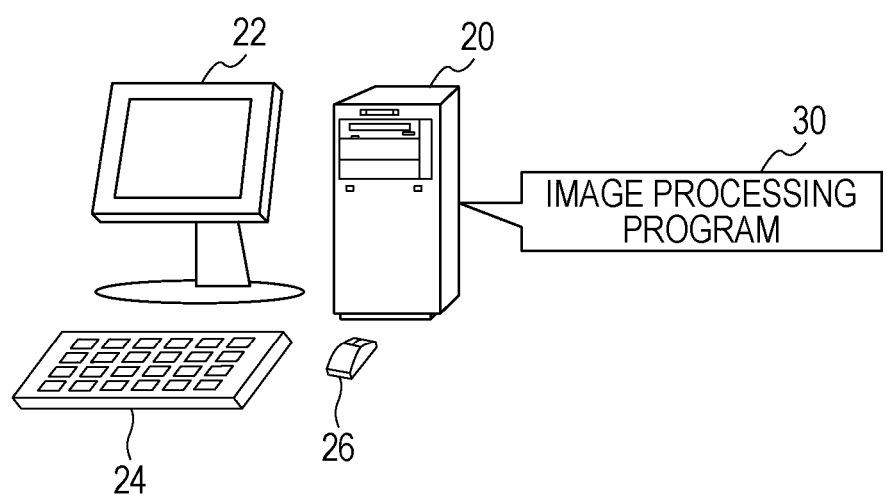
FIG. 1 is an outline diagram illustrating the configuration of a computer.

An embodiment of the invention is described below with reference to the accompanying drawings. FIG. 1 is an outline diagram illustrating the configuration of a computer 20 that is an image processing device according to the embodiment of the invention. The computer 20 according to the present embodiment is a general-purpose computer that includes a central processing unit (CPU); a ROM that stores a processing program; a RAM that temporarily stores data; a graphics processing unit (GPU); and a hard disk drive (HDD). The computer 20 is connected to a display 22, a keyboard 24, a mouse 26 and the like through an input/output processing circuit. In the present embodiment, an image processing program 30 is installed in the computer 20 and used to compress image data using the Joint Photographic Experts Group (JPEG) compression format. The computer 20 functions as the image processing device by causing the hardware and the software to function in conjunction with each other.

Figure 2:
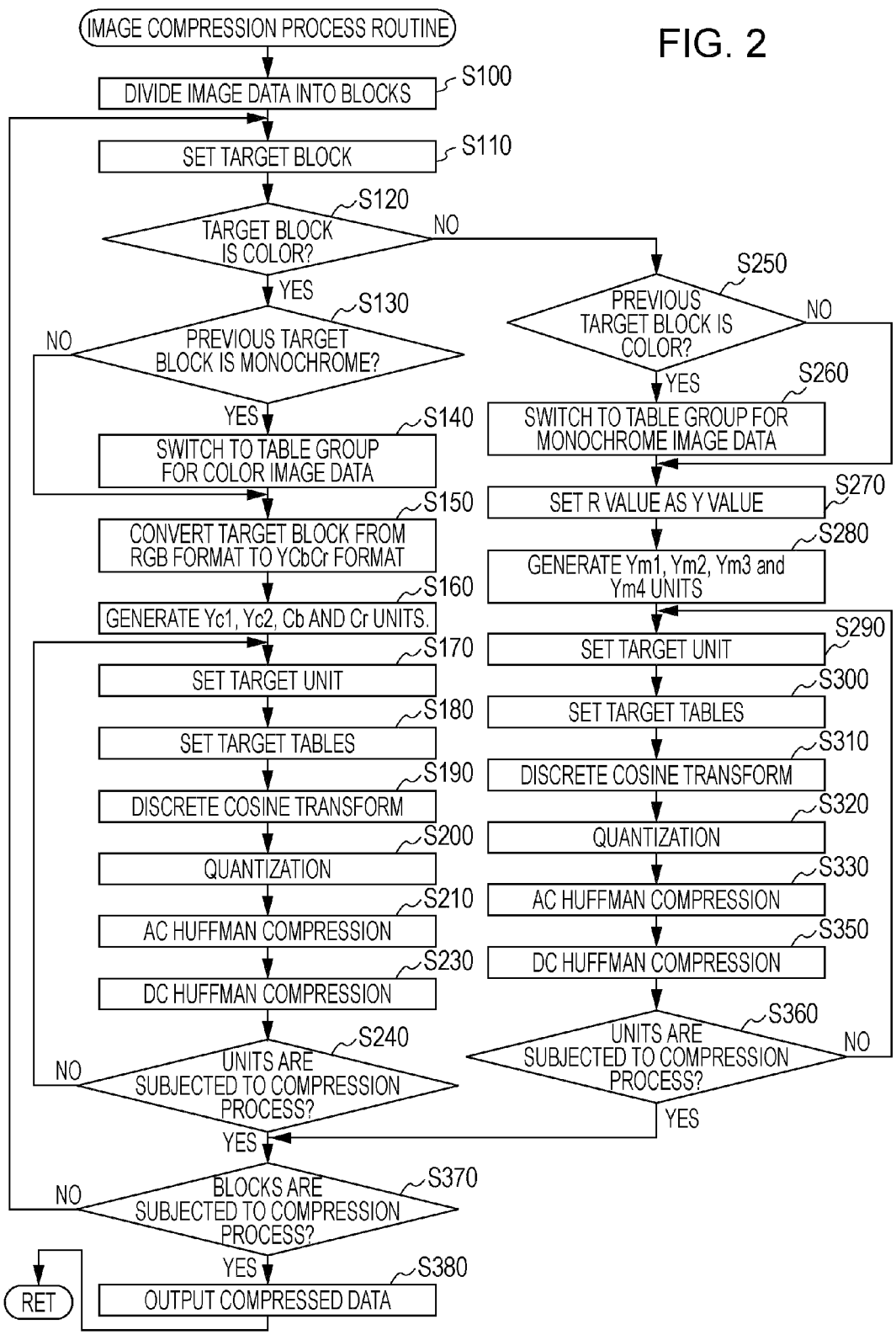
FIG. 2 is a flowchart of an example of an image compression process routine.

Next, operations of the computer 20 that has the aforementioned configuration are described. FIG. 2 is a flowchart of an example of an image compression process routine that is performed by the computer 20. The routine is performed when a user operates the keyboard 24 or the mouse 26 to instruct the computer 20 to compress selected image data using the JPEG compression format. In the present embodiment, the selected image data is in RGB format. The image data may be selected from among image data stored in the computer 20. In addition, the image data may be selected from among image data stored in an external storage medium (such as a digital camera, a mobile phone, a compact disc, or a digital versatile disc), image data read by a scanner, and image data posted on a website, while the image data can be acquired by the computer 20.

When the image compression process routine is performed, the computer 20 divides the image data into blocks that each have 256 pixels (16 pixels arranged in a vertical direction×16 pixels arranged in a horizontal direction) (in step S100). In step S100, when the image data is divided into the blocks in order from an image portion located on a top-left side of the image data to an image portion located on a bottom-right side of the image data, a block that includes an image portion located on the right side of the image data and a block that includes an image portion located on the bottom side of the image data may each include a blank pixel.

After the image data is divided into the blocks, the computer 20 sets, as a target block, one of blocks that are obtained by dividing the image data and are yet to be subjected to step S120 and subsequent steps (in step S110). Then, the computer 20 determines whether the target block is color or monochrome (in step S120). In the present embodiment, the divided blocks are selected in order from the block located on the top-left side of the image data to the block located on the bottom-right side of the image data, while the order of the blocks from the left side of the image data to the right side of the image data is prioritized over the order of the blocks from the top side of the image data to the bottom side of the image data. In the present embodiment, the computer 20 compares RGB values of each of all the pixels of the target block in RGB format. When the RGB values of each of all the pixels of the target block in RGB format are equal to each other, the computer 20 determines that the target block is monochrome. When the RGB values of each of all the pixels of the target block in RGB format are not equal to each other, the computer 20 determines that the target block is color.

When the computer 20 determines that the target block is color, the computer 20 determines whether the previous target block is color or monochrome (in step S130). When the computer 20 determines that the previous target block is monochrome, a quantization table for monochrome image data, an AC Huffman table for monochrome image data and a DC Huffman table for monochrome image data (hereinafter collectively referred to as a table group for monochrome image data), which are used for quantization, AC Huffman and DC Huffman (that are described later), respectively, are switched to a quantization table for color image data, an AC Huffman table for color image data and a DC Huffman table for color image data (hereinafter collectively referred to as a table group for color image data), which are used for quantization, AC Huffman and DC Huffman, respectively (in step S140). When the computer 20 determines that the previous target block is color in step S130, the table group for color image data has already been set and is not switched. The table group for monochrome image data and the table group for color image data are described later. When the previous target block is not present or when the target block set in step S110 is the first target block, the table group for color image data is set.

Figure 3:
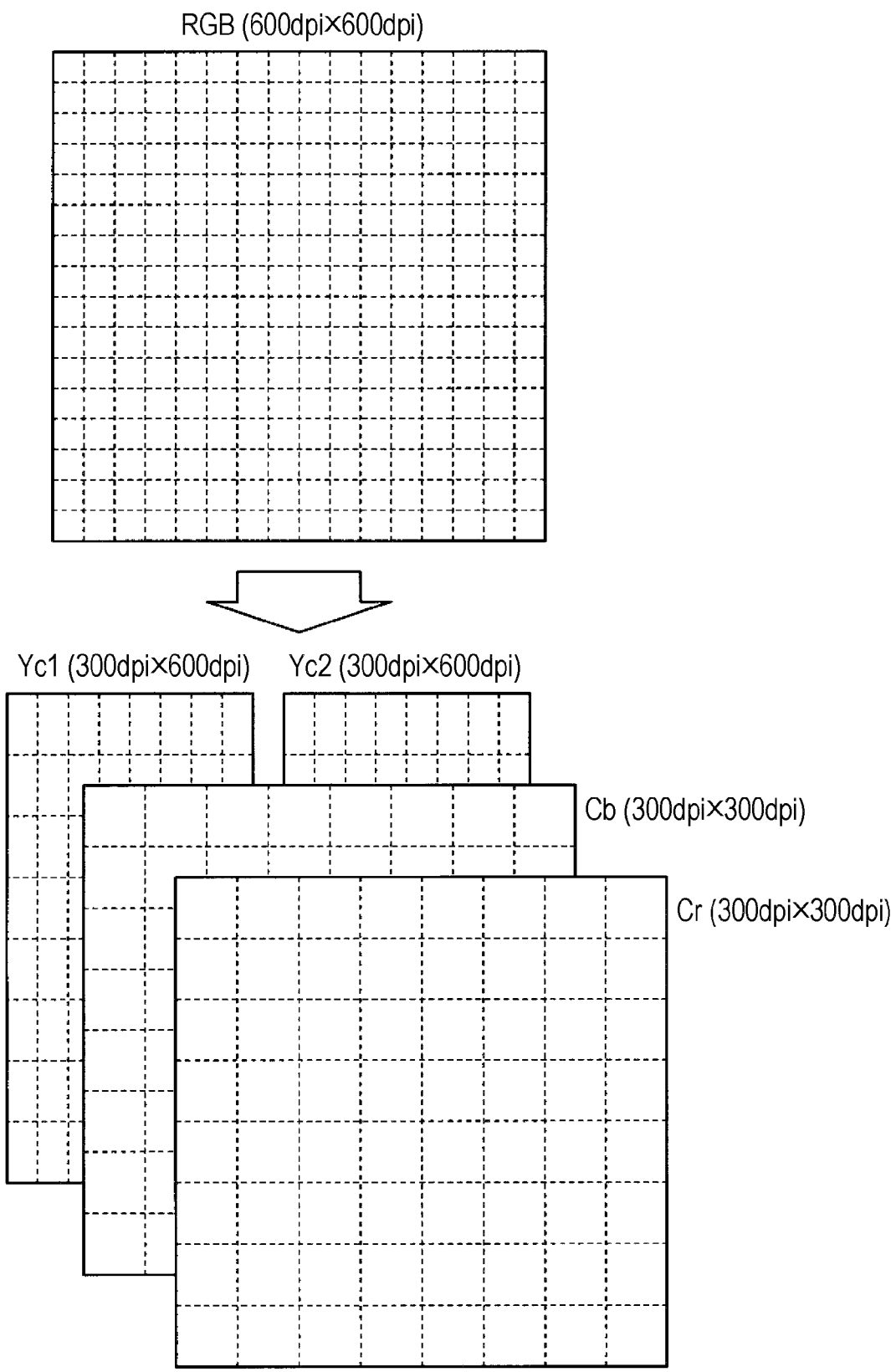
FIG. 3 is a diagram illustrating a state in which Yc1, Yc2, Cb and Cr units are generated.

Next, the computer 20 converts the target block in RGB format to the target block in YCbCr format (in step S150), and generates Yc1 and Yc2 units of a Y component of YCbCr format, a Cb unit of a Cb component of YCbCr format, and a Cr unit of a Cr component of YCbCr format (in step S160). In YCbCr format, the Y component is the brightness (luma); Cb component is blue minus luma; and Cb component is red minus luma. In addition, the Yc1 and Yc2 units and Ym1 to Ym4 (described later) units each represent the Y component. FIG. 3 is a diagram illustrating an example in which the color format of the target block (having 16 pixels arranged in the vertical direction×16 pixels arranged in the horizontal direction) is converted, and the Yc1, Yc2, Cb and Cr units are then generated. It is assumed that the resolution obtained immediately after the color format of the target block is converted (or before the Yc1, Yc2, Cb and Cr units are generated) is 600 dpi (in the vertical direction)×600 dpi (in the horizontal direction). It is also assumed that the position of each of the pixels is represented by coordinates (a coordinate from the top of the target block, a coordinate from the leftmost of the target block). In the example illustrated in FIG. 3, in order to generate the Yc1 unit, each of pairs ((2k−1, j) and (2k, j); i is an integer of 1 to 16 and j is an integer of 1 to 8) (each adjacent to each other in the vertical direction) of the pixels included in the left half ((i, k); i is an integer of 1 to 16 and k is an integer of 1 to 8) of the target block is replaced with one pixel so that the Yc1 unit is constituted by 8 pixels (arranged in the vertical direction)×8 pixels (arranged in the horizontal direction), and the average of Y values of each of the pairs (each adjacent to each other in the vertical direction) of the pixels before the replacement is set to an Y value of the pixel after the replacement. In this manner, the Yc1 unit that has a resolution of 300 dpi (in the vertical direction)×600 dpi (in the horizontal direction) is generated. In a similar manner to the Yc1 unit, in order to generate the Yc2 unit, each of pairs (each adjacent to each other in the vertical direction) of the pixels included in the right half ((i, k); i is an integer of 1 to 16 and k is an integer of 9 to 16) of the target block is replaced with one pixel so that the Yc2 unit is constituted by 8 pixels (arranged in the vertical direction)×8 pixels (arranged in the horizontal direction), and the average of Y values of each of the pairs (each adjacent to each other in the vertical direction) of the pixels before the replacement is set to an Y value of the pixel after the replacement. In this manner, the Yc2 unit that has a resolution of 300 dpi (in the vertical direction)×600 dpi (in the horizontal direction) is generated. In addition, in order to generate each of the Cb and Cr units, each group ((2k−1, 2m−1), (2k−1, 2m), (2k, 2m−1) and (2k, 2m); k is an integer of 1 to 8 and m is an integer of 1 to 8) of 4 pixels (2 pixels (adjacent to each other in the vertical direction)×2 pixels (adjacent to each other in the horizontal direction) of the target block is replaced with one pixel so that the unit is constituted by 8 pixels (arranged in the vertical direction)×8 pixels (arranged in the horizontal direction); the average of Cb values of each of the groups of the 4 pixels before the replacement is set to a Cb value of the pixel after the replacement; and the average of Cr values of each of the groups of the 4 pixels before the replacement is set to a Cr value of the pixel after the replacement. In this manner, the Cb and Cr units that each have a resolution of 300 dpi (in the vertical direction)×300 dpi (in the horizontal direction) are generated.

After the Yc1, Yc2, Cb and Cr units are generated, the computer 20 sets, as a target unit, one of the Yc1, Yc2, Cb and Cr units, which is yet to be subjected to discrete cosine transform (DCT), quantization, AC Huffman compression and DC Huffman compression (that are also collectively referred to as a compression process) (in step S170). The DCT, the quantization, the AC Huffman compression and the DC Huffman compression are described later. A quantization table, an AC Huffman table and a DC Huffman table, which correspond to the target unit, are selected from among the table group for color image data and set as a target quantization table, a target AC Huffman table and a target DC Huffman table (in step S180). In the present embodiment, two quantization tables, two AC Huffman tables and two DC Huffman tables, which are used as the table group for color image data, are prepared for the Yc1 and Yc2 units, while two quantization tables, two AC Huffman tables and two DC Huffman tables, which are used as the table group for color image data, are prepared for the Cb and Cr units. In the present embodiment, any of the target quantization tables, any of the target AC Huffman tables and any of the target DC Huffman tables are set depending on whether the target unit is any of the Yc1 and Yc2 units or any of the Cb and Cr units. FIG. 4 illustrates an example of the quantization table for the Yc1 and Yc2 units, while FIG. 5 illustrates an example of the quantization table for the Cb and Cr units. FIG. 6 illustrates an example of the AC Huffman table for the Yc1 and Yc2 units, while FIG. 7 illustrates an example of the AC Huffman table for the Cb and Cr units. FIG. 8 illustrates an example of the DC Huffman table for the Yc1 and Yc2 units, while FIG. 9 illustrates an example of the DC Huffman table for the Cb and Cr units.

Next, component values of the target unit are converted into DCT coefficients by discrete cosine transform (DCT) (in step S190). The DCT coefficients obtained by the conversion are quantized using the target quantization table (in step S200). In general, one of the quantized DCT coefficients, which is located on the top-left side of the unit, is a direct current (DC) component and is called a DC coefficient. The other quantized DCT coefficients of the unit are alternate current (AC) components and are called AC coefficients. The AC Huffman compression is performed on the AC coefficients using the target AC Huffman table (in step S210). The DC Huffman compression is performed on the DC coefficient using the target DC Huffman table (in step S230). In the present embodiment, when differences (hereinafter referred to as DC differences) between the DC coefficients of the Cb and Cr units generated from the target block and DC coefficients of Cb and Cr units generated from the previous color target blocks can be calculated (or when the target block set in step S110 is not the first target block), the DC differences are calculated before the DC Huffman compression. After that, the DC Huffman compression is performed. When the difference (hereinafter referred to as the DC difference) between the DC coefficient of any (e.g., Yc2 unit) of the Yc1, Yc2 and Ym1 to Ym4 (described later) units generated from the target block and the DC coefficient of any (e.g., Yc1 unit) of the Yc1, Yc2 and Ym1 to Ym4 units generated from the previous target block can be calculated (or when the target block set in step S110 is not the first target block), the DC difference is calculated before the DC Huffman compression. After that, the DC Huffman compression is performed. The DC difference is not limited to the aforementioned difference and may be any DC difference calculated on the basis of a predetermined rule. For example, the DC difference may be the difference between the DC coefficient of one (e.g., Yc1 unit) of the Yc1, Yc2, Ym1 to Ym4 units generated from the target block and the DC coefficient of a unit that has the same name as the one of the Yc1, Yc2, Ym1 to Ym4 units generated from the target block and has been generated from the previous target block. The compression process (discrete cosine transform, quantization, AC Huffman compression and DC Huffman compression) is known and is not described in detail.

Then, the computer 20 determines whether or not all the Yc1, Yc2, Cb and Cr units are subjected to the compression process (in step S240). When the computer 20 determines that any of the Yc1, Yc2, Cb and Cr units is yet to be subjected to the compression process, the routine returns to step S170, and steps S170 to S240 are performed. When the computer 20 determines that all the Yc1, Yc2, Cb and Cr units are subjected to the compression process, the computer 20 determines whether or not all the blocks are subjected to the compression process (in step S370). When the computer 20 determines that any of the blocks is yet to be subjected to the compression process, the routine returns to step S110. When the computer 20 determines that all the blocks are subjected to the compression process, the computer 20 outputs the data compressed by performing the compression process on all the blocks (in step S380). For example, the computer 20 displays the compressed data on the display 22 or stores the compressed data in the hard disk drive. Then, the routine is terminated.

When the computer 20 determines that the target block is monochrome in step S120, the computer 20 determines whether the previous target block is color or monochrome (in step S250). When the computer 20 determines that the previous target block is color, the table group for color image data is switched to the table group for monochrome image data (in step S260). When the computer 20 determines that the previous target block is monochrome, the table group for monochrome image data has already been set and is not switched. When the previous target block is not present or when the target block set in step S110 is the first target block, the table group for monochrome image data is set.

Figure 10:
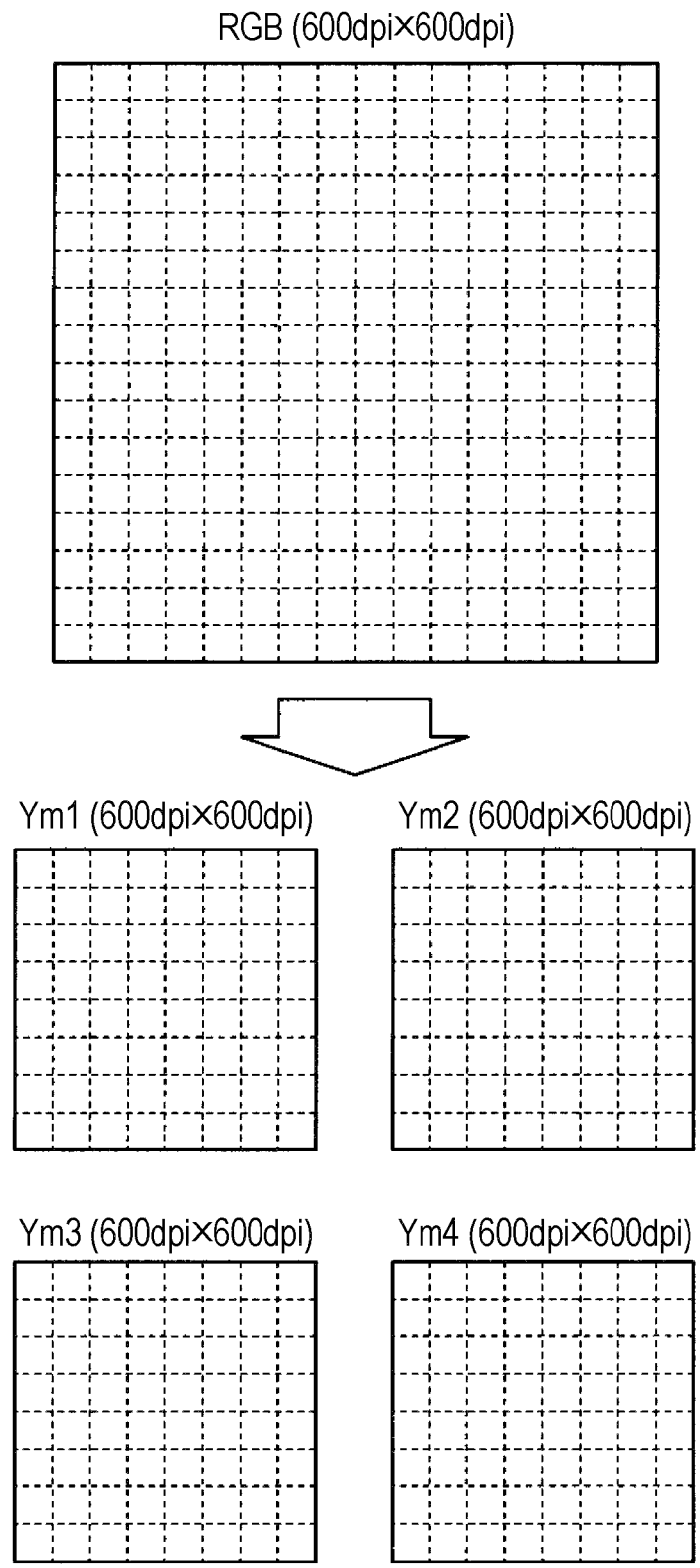
FIG. 10 is a diagram illustrating a state in which Ym1 to Ym4 units are generated.

When the target block is monochrome, the RGB values of each of all the pixels of the target block are equal to each other and regarded to be equal to an Y value in YCbCr format. Thus, the R value (or the G value or the B value) is set as the Y value (in step S270), and the Ym1 to Ym4 units are generated (in step S280). FIG. 10 is a diagram illustrating an example of a state in which the Ym1 to Ym4 units are generated from the target block (16 pixels arranged in the vertical direction×16 pixels arranged in the horizontal direction) while the color format of the target block is converted. In the example illustrated in FIG. 10, the target block is divided along vertical and horizontal central lines of the target block into four regions: an upper left region ((i., j); i is an integer of 1 to 8 and j is an integer of 1 to 8); an upper right region ((i., j); i is an integer of 1 to 8 and j is an integer of 9 to 16); a lower left region ((i., j); i is an integer of 9 to 16 and j is an integer of 1 to 8); and a lower right region ((i., j); i is an integer of 9 to 16 and j is an integer of 9 to 16). The upper left region, the upper right region, the lower left region and the lower right region are set as the Ym1 unit, the Ym2 unit, the Ym3 unit and the Ym4 unit, respectively. In this case, since the target block is divided into the four regions so that the Ym1 to Ym4 units are generated, the resolution of the target block in RGB format is maintained. Thus, when the resolution of the target block in RGB format is 600 dpi (in the vertical direction)×600 dpi (in the horizontal direction), the resolution of each of the Ym1 to Ym4 units is also 600 dpi (in the vertical direction)×600 dpi (in the horizontal direction).

After the Ym1 to Ym4 units are generated, the computer 20 sets, as a target unit, one of the Ym1 to Ym4 units, which is yet to be subjected to the compression process (in step S290). A quantization table, an AC Huffman table and a DC Huffman table, which correspond to the target unit, are selected from among the table group for monochrome image data and set as a target quantization table, a target AC Huffman table and a target DC Huffman table (in step S300). In a similar manner to the aforementioned steps S190 to S230, discrete cosine transform, quantization, AC Huffman compression and DC Huffman compression are performed using the target quantization table, the target AC Huffman table and the target DC Huffman table (in steps S310 to S350). In the present embodiment, one quantization table, one AC Huffman table and one DC Huffman table are prepared as the table group for monochrome image data. In other words, the same target quantization table, the same AC Huffman table and the same DC Huffman table are set for the Ym1 to Ym4 units regardless of whether the target unit is the Ym1, Ym2, Ym3 or Ym4 unit. In the present embodiment, the table group for the Yc1 and Yc2 units is used as the table for monochrome image data. When the target block is monochrome, the Ym1 to Ym4 units are generated from the monochrome target block and have a higher resolution than the units generated from the color target block (or maintain the resolution of the target block in RGB format). The generated Ym1 to Ym4 units are subjected to the compression process. Thus, the units that are generated from the monochrome target block and have a higher resolution than the units generated from the color target block can be compressed. On the other hand, when the target block is color, the Yc1, Yc2, Cb and Cr units are generated from the color target block and have a lower resolution than the units generated from the monochrome block. The generated Yc1, Yc2, Cb and Cr units are subjected to the compression process. Thus, the color block can be compressed at a higher compression rate than the monochrome block. Therefore, the compression process can be appropriately performed on the basis of whether the block is color or monochrome, and the image data can be appropriately compressed. As described above, the units generated from the monochrome block have a higher resolution than the units generated from the color block, and the compression process is performed on the units. This is due to the fact that in consideration of human visual characteristics, it is less likely that a relatively high resolution is required for color blocks and highly likely that a relatively high resolution is required for monochrome blocks such as black characters.

Then, the computer 20 determines whether or not all the Ym1 to Ym4 units are subjected to the compression process (in step S360). When the computer 20 determines that any of the Ym1 to Ym4 units is yet to be subjected to the compression process, the routine returns to step S290, and steps S290 to S360 are performed. When the computer 20 determines that all the Ym1 to Ym4 units are subjected to the compression process, the computer 20 determines whether or not all the blocks are subjected to the compression process (in step S370). When the computer 20 determines that any of the blocks is yet to be subjected to the compression process, the routine returns to step S110. When the computer 20 determines that all the blocks are subjected to the compression process, the computer 20 outputs the data compressed by performing the compression process on all the blocks (in step S380). For example, the computer 20 displays the compressed data on the display 22 or stores the compressed data in the hard disk drive. Then, the routine is terminated.

The relationships between the elements according to the present embodiment and elements according to the invention are described below. Step S110 of the image compression process routine according to the present embodiment corresponds to selection and acquisition (of a block to be compressed) according to the invention. Step S120 of the image compression process routine according to the present embodiment corresponds to a determination (of whether the acquired block is color or monochrome) according to the invention. Steps S130 to S360 of the image compression process routine according to the present embodiment correspond to generation of units and a compression process according to the invention. In addition, the computer 20 that is the image processing device according to the present embodiment corresponds to an acquiring section, a determining section and a compressing section. In the present embodiment, an example of a program according to the invention is clarified by the description of the operations of the computer 20.

When the target block is color, the computer 20 according to the present embodiment generates the Yc1, Yc2, Cb and Cr units in YCbCr format and performs the compression process using the generated Yc1, Yc2, Cb and Cr units and the table group for color image data. When the target block is monochrome, the computer 20 divides the block into four regions, generates the Ym1 to Ym4 units, and performs the compression process using the generated Ym1 to Ym4 units and the table group for monochrome image data. Thus, the computer 20 is capable of appropriately performing the compression process on the basis of whether the target block is color or monochrome and appropriately compressing the image data. When the block that is obtained by dividing the image data and in RGB format is color, the computer 20 reduces the resolution of the block, generates the Yc1, Yc2, Cb and Cr units, and performs the compression process. When the block that is obtained by dividing the image data is monochrome, the computer 20 maintains the resolution of the block, generates the Ym1 to Ym4 units, and performs the compression process. Thus, the computer 20 is capable of compressing the image data while maintaining the resolution of the monochrome block.

The invention is not limited to the aforementioned embodiment and may be variously modified without departing from the technical scope of the invention.

In the aforementioned embodiment, the blocks are each constituted by 16 pixels (arranged in the vertical direction)×16 pixels (arranged in the horizontal direction). However, the number of each of the blocks is not limited to 16 pixels×16 pixels. The blocks may be each constituted by 8 pixels (arranged in the vertical direction)×8 pixels (arranged in the horizontal direction) or by 32 pixels (arranged in the vertical direction)×32 pixels (arranged in the horizontal direction).

In the aforementioned embodiment, the RGB values of each of the pixels included in the target block in RGB format are compared. When the RGB values are equal to each other, it is determined that the target block is monochrome. When the RGB values are not equal to each other, it is determined that the target block is color. However, the determination process is not limited to the process described in the aforementioned embodiment. Before it is determined whether the target block is color or monochrome, it may be determined whether or not the target block is a part of data on a black character, and black separation may be performed. When it is determined that the target block is a part of data on a black character, the black separation is performed to reduce a chroma component of the block. When it is determined that the target block is not a part of data on a black character, the black separation is performed to increase the chroma component.

In the aforementioned embodiment, when the target block is color, the Yc1 and Yc2 units of the Y component, the Cb unit of the Cb component, and the Cb unit of the Cr component are generated. However, units to be generated are not limited to the units described in the aforementioned embodiment. When the target block is color, one unit of the Y component, one unit of the Cb component, one unit of the Cr component, and one unit of another component (e.g., transparency) may be generated.

In the aforementioned embodiment, when the target block is color, the Yc1, Yc2, Cb and Cr units are generated; and when the target block is monochrome, the Ym1 to Ym4 units are generated. The number of units to be generated may be three or less or may be five or more.

In the aforementioned embodiment, when the target block is color, RGB format is converted into YCbCr format, the Yc1, Yc2, Cb and Cr units are generated after the conversion of the color format, and the compression process is then performed on the Yc1, Yc2, Cb and Cr units. However, the color formats are not limited to the formats described in the aforementioned embodiment. CMYK format may be used.

In the aforementioned embodiment, when the target block is monochrome, the table group for the Yc1 and Yc2 units, which is the table group for color image data, is used as the table group for monochrome image data (or shared by the Yc1 and Yc2 units and the Ym1 to Ym4 units). However, when the target block is monochrome, a table group (e.g., table group that causes a high-frequency component to easily remain compared with the table group for the Yc1 and Yc2 units) for monochrome image data, which is different from the table group for the Yc1 and Yc2 units, may be used as the table group for monochrome image data.

Figure 11:
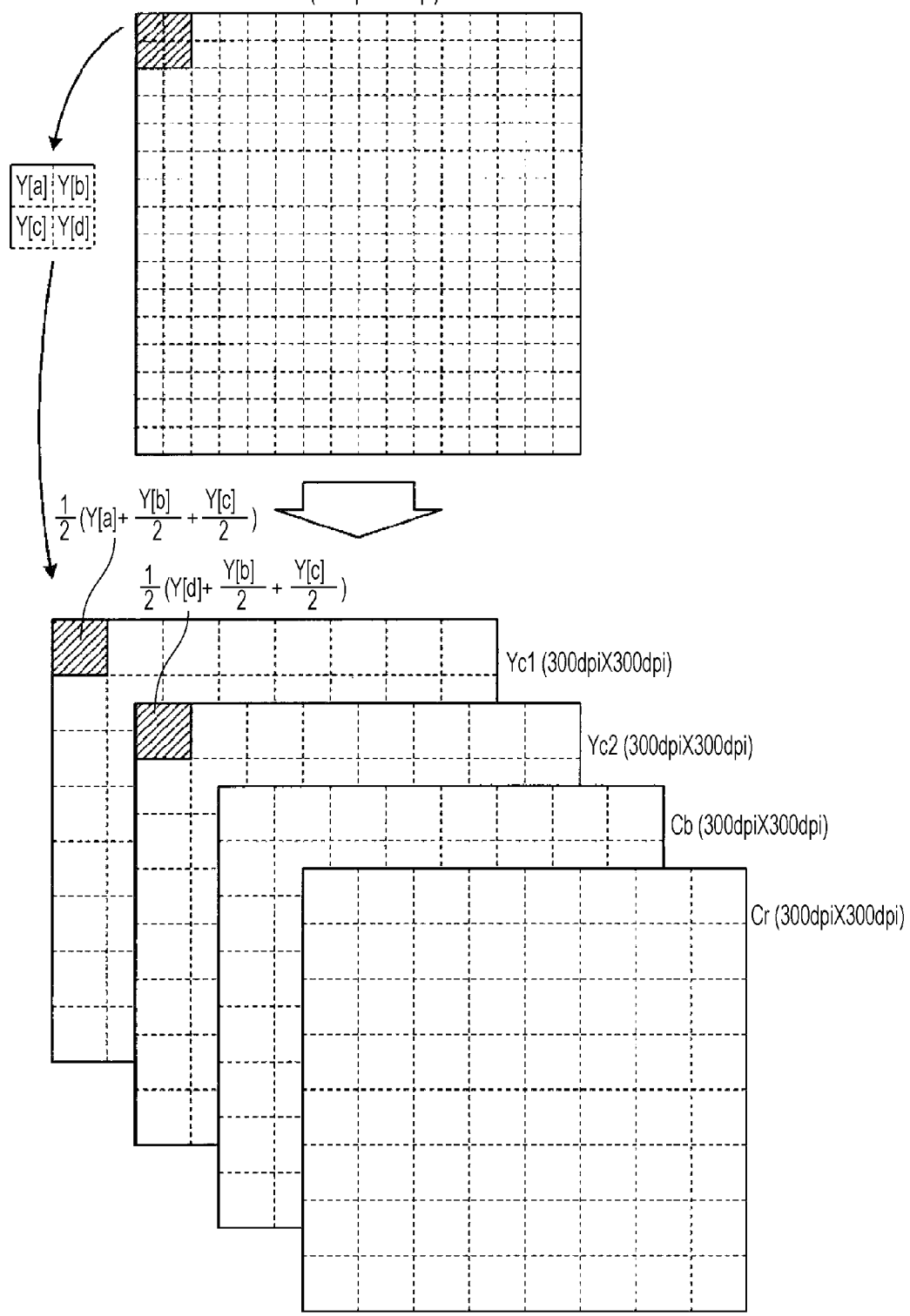
FIG. 11 is a diagram illustrating another state in which the Yc1, Yc2, Cb and Cr units are generated.

In the aforementioned embodiment, when the target block is color, each of the pairs ((2k−1, j) and (2k, j); i is an integer of 1 to 16 and j is an integer of 1 to 8) (each adjacent to each other in the vertical direction) of the pixels of the left half ((i, k); i is an integer of 1 to 16 and k is an integer of 1 to 8) of the target block is replaced with one pixel so that the Yc1 unit is constituted by 8 pixels (arranged in the vertical direction)×8 pixels (arranged in the horizontal direction), and the average of the Y values of each of the pairs (each adjacent to each other in the vertical direction) of the pixels before the replacement is set to the Y value of the pixel after the replacement. In this manner, the Yc1 unit is generated. In a similar manner to the Yc1 unit, each of pairs of the pixels (each adjacent to each other in the vertical direction) of the right half ((i, k); i is an integer of 1 to 16 and k is an integer of 9 to 16) of the target block is replaced with one pixel so that the Yc2 unit is constituted by 8 pixels (arranged in the vertical direction)×8 pixels (arranged in the horizontal direction), and the average of the Y values of each of the pairs (each adjacent to each other in the vertical direction) of the pixels before the replacement is set to the Y value of the pixel after the replacement. In this manner, the Yc2 is generated. However, as illustrated in FIG. 11, the Yc1 unit may be generated in the following manner: each of groups ((2k−1, 2m−1), (2k−1, 2m), (2k, 2m−1) and (2k, 2m); k is an integer of 1 to 8 and m is an integer of 1 to 8) of 4 pixels (2 pixels (adjacent to each other in the vertical direction)×2 pixels (adjacent to each other in the horizontal direction) of the target block is replaced with one pixel so that the Yc1 unit is constituted by 8 pixels (arranged in the vertical direction)×8 pixels (arranged in the horizontal direction); and an Y value of each of the pixels after the replacement is set to a value obtained by weighting Y values (Y[a], Y[b], and Y[c] illustrated in FIG. 11) of the 4 pixels (2 pixels (adjacent to each other in the vertical direction)×2 pixels (adjacent to each other in the horizontal direction) (before the replacement) on the basis of the following Equation 1. In addition, the Yc2 unit may be generated in the following manner: each of the groups of 4 pixels (2 pixels (adjacent to each other in the vertical direction)×2 pixels (adjacent to each other in the horizontal direction) of the target block is replaced with one pixel so that the Yc2 unit is constituted by 8 pixels (arranged in the vertical direction)×8 pixels (arranged in the horizontal direction); and the Y value of each of the pixels after the replacement is set to a value obtained by weighting Y values (Y[b], Y[c] and Y[d] illustrated in FIG. 11) of the 4 pixels (2 pixels (adjacent to each other in the vertical direction)×2 pixels (adjacent to each other in the horizontal direction) (before the replacement) on the basis of the following Equation 2.

$$Y = (Y[a] + Y[b]/2 + Y[c]/2)/2 \quad (1)$$

$$Y = (Y[d] + Y[b]/2 + Y[c]/2)/2 \quad (2)$$

Figure 12:
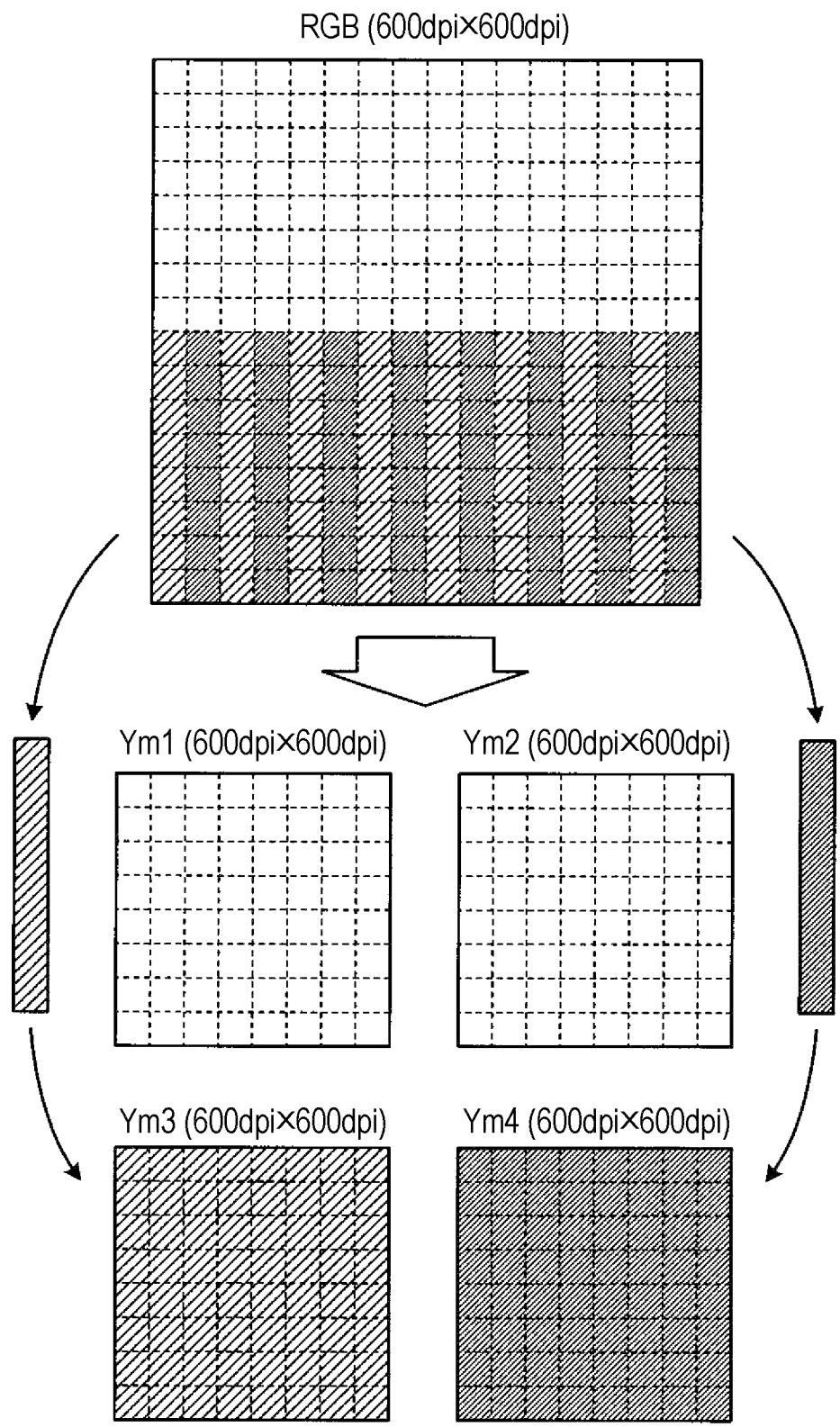
FIG. 12 is a diagram illustrating another state in which the Ym1 to Ym4 units are generated.

In the aforementioned embodiment, when the target block is monochrome, the target block is divided into the four regions: the upper left region ((i., j); i is an integer of 1 to 8 and j is an integer of 1 to 8); the upper right region ((i., j); i is an integer of 1 to 8 and j is an integer of 9 to 16); the lower left region ((i., j); i is an integer of 9 to 16 and j is an integer of 1 to 8); and the lower right region ((i., j); i is an integer of 9 to 16 and j is an integer of 9 to 16). The upper left region, the upper right region, the lower left region and the lower right region are set as the Ym1 unit, the Ym2 unit, the Ym3 unit and the Ym4 unit, respectively. The division of the target block is not limited to the division described in the aforementioned embodiment. For example, as illustrated in FIG. 12, when the target block is monochrome, the upper half of the target block is divided into the upper left region and the upper right region that are set as the Ym1 and Ym2 units in the same manner as the aforementioned embodiment, while the lower half of the target block may be divided into a region formed by combining odd columns (from the left side of the target block) of pixels included in the lower half of the target block and a region formed by combining even columns of pixels included in the lower half of the target block. In this case, the region formed by combining the odd columns of the pixels and the region formed by combining the even columns of the pixels are set as the Ym3 and Ym4 units, respectively. In addition, the upper half of the target block may be divided into a region formed by combining odd columns (from the left side of the target block) of pixels included in the upper half of the target block and a region formed by combining even columns of pixels included in the upper half of the target block, while the lower half of the target block is divided into the lower left region and the lower right region that are set as the Ym3 and Ym4 units in the same manner as the aforementioned embodiment. In this case, the region formed by combining the odd columns of the pixels and the region formed by combining the even columns of the pixels are set as the Ym1 and Ym2 units. Furthermore, the target block may be divided into: the region formed by combining the odd columns (from the left side of the target block) of the pixels included in the upper half of the target block; the region formed by combining the even columns of the pixels included in the upper half of the target block; the region formed by combining the odd columns of the pixels included in the lower half of the target block; and the region formed by combining the even columns of the pixels included in the lower half of the target block. In this case, the region formed by combining the odd columns included in the upper half of the target block, the region formed by combining the even columns included in the upper half of the target block, the region formed by combining the odd columns included in the lower half of the target block, the region formed by combining the even columns included in the lower half of the target block are set as the Ym1, Ym2, Ym3 and Ym4 units, respectively. Furthermore, the left half of the target block is divided into the upper left region and the lower left region that are set as the Ym1 and Ym3 units in the same manner as the aforementioned embodiment, while the right half of the target block may be divided into a region formed by combining odd rows (from the top of the target block) of pixels included in the right half of the target block and a region formed by combining even rows of pixels included in the right half of the target block. In this case, the region formed by combining the odd rows of the pixels included in the right half of the target block and the region formed by combining the even rows of the pixels included in the right half of the target block are set as the Ym2 and Ym4 units, respectively. Furthermore, the left half of the target block may be divided into a region formed by combining odd rows (from the top of the target block) of pixels included in the left half of the target block and a region formed by combining even rows of pixels included in the left half of the target block, while the right half of the target block is divided into the upper right region and the lower right region that are set as the Ym2 and Ym4 units in the same manner as the aforementioned embodiment. In this case, the region formed by combining the odd rows of the pixels included in the left half of the target block and the region formed by combining the even rows of the pixels included in the left half of the target block are set as the Ym1 and Ym3 units, respectively. Furthermore, the target block may be divided into the region formed by combining the odd rows (from the top of the target block) of the pixels included in the left half of the target block, the region formed by combining the even rows (from the top of the target block) of the pixels included in the left half of the target block, the region formed by combining the odd rows (from the top of the target block) of the pixels included in the right half of the target block, and the region formed by combining the even rows (from the top of the target block) of the pixels included in the right half of the target block. In this case, the region formed by combining the odd rows of the pixels included in the left half of the target block, the region formed by combining the even rows of the pixels included in the left half of the target block, the region formed by combining the odd rows of the pixels included in the right half of the target block, the region formed by combining the even rows of the pixels included in the right half of the target block, are set as the Ym1, Ym3, Ym2 and Ym4 units, respectively.

In the aforementioned embodiment, when the target block is color, the Yc1, Yc2, Cb and Cr units are set as the target units one by one and subjected to the discrete cosine transform, the discretization, the AC Huffman compression and the DC Huffman compression one by one. When the target block is monochrome, the Ym1 to Ym4 units are set as the target units one by one and subjected to the discrete cosine transform, the discretization, the AC Huffman compression and the DC Huffman compression one by one. However, when the target block is color, the Yc1, Yc2, Cb and Cr units may be subjected to the discrete cosine transform, the discretization, the AC Huffman compression and the DC Huffman compression in parallel. When the target block is monochrome, the Ym1 to Ym4 units may be subjected to the discrete cosine transform, the discretization, the AC Huffman compression and the DC Huffman compression in parallel. In this case, the compression process can be performed on each of the blocks at a high speed.

In the aforementioned embodiment, the discrete cosine transform, the quantization, the AC Huffman compression and the DC Huffman compression are performed in order to compress image data. However, instead of the AC Huffman compression and the DC Huffman compression, other entropy compression such as arithmetic compression may be performed in order to image data.

The embodiment describes the process of compressing the image data and generating the compressed data. In order to decompress the compressed data, information that indicates whether the blocks are each color or monochrome is necessary. Thus, the image data may be compressed in a manner in which a restart marker is provided every time a color block and a monochrome block are switched. The compressed data may be decompressed in a manner in which a color or monochrome block is switched to the other block on the basis of each of the restart markers. In addition, block type information that is provided for each of the blocks and indicates whether the block is color or monochrome may be inserted in the image data, and the image data may be compressed on the basis of the inserted block type information. The compressed data may be decompressed (developed) in a manner in which the blocks are each determined to be color or monochrome on the basis of the block type information. Furthermore, the block type information may be separated from the compressed data, and the compressed data may be decompressed in the manner in which the blocks are each determined to be color or monochrome on the basis of the block type information. The compressed data is decompressed (developed) by performing the reverse process of the process of compressing the image data or by performing Huffman decoding, inverse quantization and inverse discrete cosine transform in this order.

Figure 13:
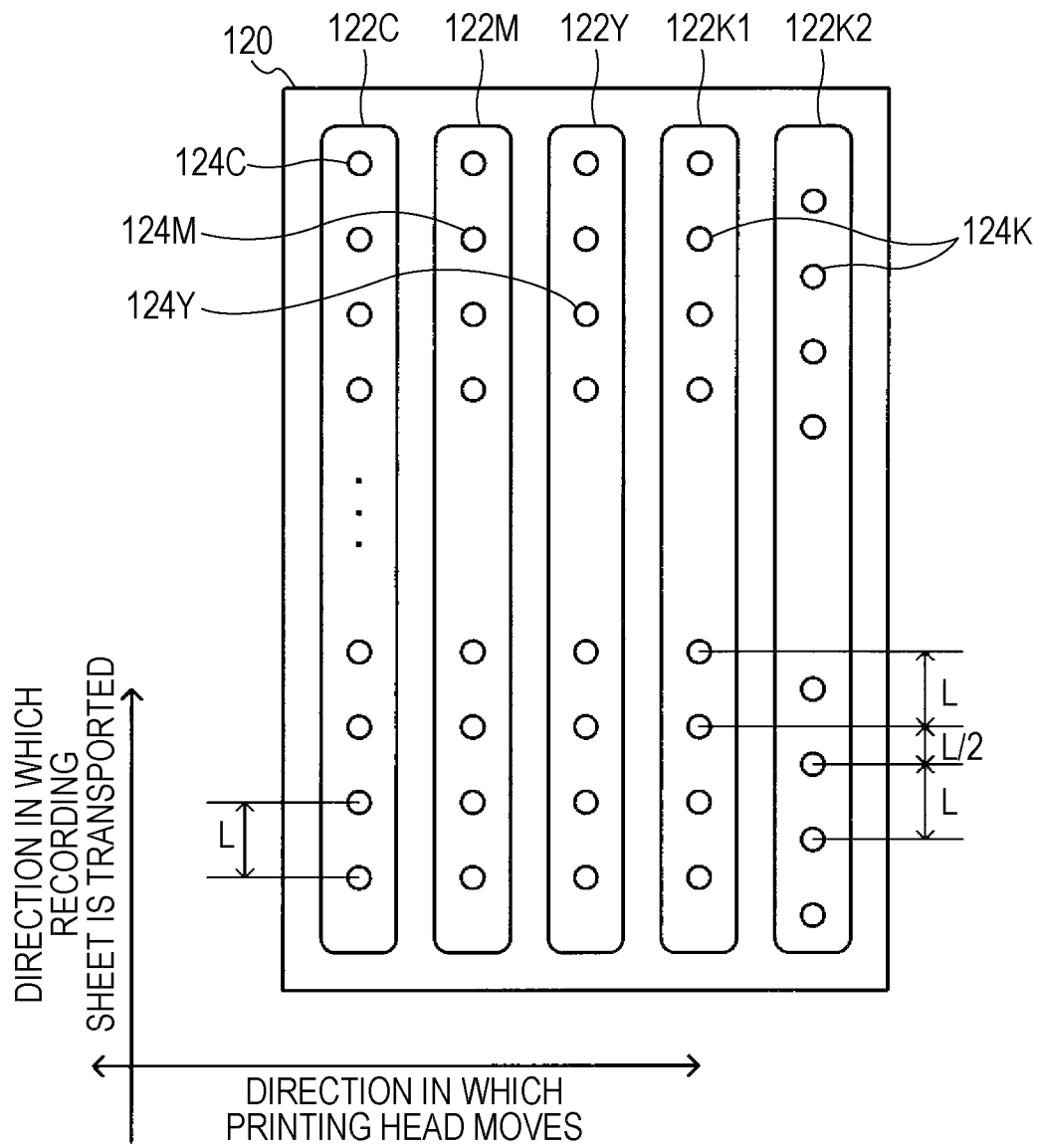
FIG. 13 is a diagram illustrating an example of the configuration of a printing head.

In the aforementioned embodiment, the image data is compressed so that the color block of the image data is compressed at a high compression rate and the units generated from the color block each have a low resolution. In addition, in the aforementioned embodiment, the image data is compressed so that the monochrome block of the image data is compressed at a low compression rate and the units generated from the monochrome block each have a high resolution. When an ink jet printer that is capable of printing a black (K) image with a higher resolution than images of other colors (such as cyan (C), magenta (M) and yellow (Y)) develops the compressed data (obtained in the same manner as in the aforementioned embodiment), converts the color format of the data into CMYK format and performs printing, an image can be printed with appropriate quality. FIG. 13 illustrates an example of the configuration of a printing head 120 that is included in the ink jet printer. The printing head 120 illustrated in FIG. 13 includes nozzle arrays 122C, 122M, 122Y, 122K1 and 122K2 that extend in the direction in which a recording sheet is transported. The nozzle array 122C includes nozzles 124C that are capable of ejecting cyan ink. The nozzle array 122M includes nozzles 124M that are capable of ejecting magenta ink. The nozzle array 122Y includes nozzles 124Y that are capable of ejecting yellow ink. The nozzle arrays 122K1 and 122K2 each include nozzles 124K that are capable of ejecting black ink. The nozzles 124C are arranged at intervals of L (for example, 1/300 inches) in the direction in which the recording sheet is transported. The nozzles 124M are arranged at intervals of L (for example, 1/300 inches) in the direction in which the recording sheet is transported. The nozzles 124Y are arranged at intervals of L (for example, 1/300 inches) in the direction in which the recording sheet is transported. The nozzles 124K included in the nozzle arrays 122K1 and 122K2 are arranged in a zigzag pattern. In addition, the nozzles 124K included in the nozzle arrays 122K1 and 122K2 are arranged at intervals of L/2 (for example, 1/600 inches) in the direction in which the recording sheet is transported. Thus, the printing head 120 is capable of printing a black image that has a higher resolution than cyan, magenta and yellow images that are printed by the printing head 120. When the ink jet printer that includes the printing head 120 prints data compressed in the same manner as in the aforementioned embodiment, an image can be printed with appropriate quality.

In the aforementioned embodiment, the invention is applied to the general-purpose computer. However, the invention may be applied to any device that is capable of compressing image data. For example, the invention may be applied to a printer, a scanner, a digital camera, a facsimile, a mobile phone that has a function of processing an image, and the like.

The invention can be used in the industry for manufacturing of image processing devices.

What is claimed is:

1. An image processing method for dividing image data into a plurality of blocks and compressing the blocks on a block basis comprising:
   sequentially selecting a block to be compressed from among the plurality of blocks and acquiring the selected block;
   determining whether the acquired block is color or monochrome; and
   when it is determined that the acquired block is color, generating a predetermined number of units of color components of a predetermined color format while a resolution of each of the units of the color components is reduced and performing a compression process using the predetermined number of units of the color components and a table for color image data, wherein the predetermined number of units represent all color components of the predetermined color format, and
   when it is determined that the acquired block is monochrome, generating a predetermined number of units of one color component of the predetermined color format by dividing the acquired block while a resolution of the units of the one color component is maintained, and performing a compression process using the generated units of the one color component and a table for monochrome image data, wherein no units of other components of the predetermined color format are generated.

2. The image processing method according to claim 1, wherein when it is determined that the acquired block is color, four units of the color components of the predetermined color format are generated, and when it is determined that the acquired block is monochrome, four units of the one component of the predetermined color format are generated while the acquired block is divided along center lines of the acquired block, one of the center lines extending in a vertical direction of the acquired block, the other center line extending in a horizontal direction of the acquired block.

3. The image processing method according to claim 1, wherein when it is determined that the acquired block is color, two units of an Y component of YCbCr format, one unit of a Cb component of YCbCr format, and one unit of a Cr component of YCbCr format are generated, and when it is determined that the acquired block is monochrome, four units of the Y component are generated while the acquired block is divided.

4. The image processing method according to claim 1, wherein it is determined whether the acquired block is color or monochrome by comparing RGB values of the acquired block in RGB format.

5. The image processing method according to claim 1, wherein it is determined whether the acquired block is color or monochrome after predetermined black separation is performed on the acquired block.

6. A non-transitory computer readable storage medium that stores a program that causes a computer to perform the image processing method according to claim 1.

7. An image processing method for dividing image data into a plurality of blocks and compressing the blocks on a block basis comprising:
   sequentially selecting a block to be compressed from among the plurality of blocks and acquiring the selected block;
   determining whether the acquired block is color or monochrome; and
   when it is determined that the acquired block is color, generating a predetermined number of units of color components of a predetermined color format and performing a compression process using the predetermined number of units of the color components and a table for color image data, and
   when it is determined that the acquired block is monochrome, generating a predetermined number of units of one color component of the predetermined color format while dividing the acquired block, and performing a compression process using the generated units of the one color component and a table for monochrome image data;
   wherein when it is determined that the acquired block is color, four units of the color components of the predetermined color format are generated, and when it is determined that the acquired block is monochrome, four units of the one component of the predetermined color format are generated while a half of the acquired block is divided according to a first method and the other half of the acquired block is divided according to a second method that is different from the first method.

8. The image processing method according to claim 7, wherein when it is determined that the acquired block is monochrome, an upper half of the acquired block is divided along a center line of the upper half of the acquired block into first and second units, and a lower half of the acquired block is divided into third and fourth units, the center line of the upper half of the acquired block extending in a vertical direction of the acquired block, the third unit being formed by combining odd columns of pixels included in the lower half of the acquired block, the fourth unit being formed by combining even columns of pixels included in the lower half of the acquired block.

9. An image processing method for dividing image data into a plurality of blocks and compressing the blocks on a block basis comprising:
   sequentially selecting a block to be compressed from among the plurality of blocks and acquiring the selected block;
   determining whether the acquired block is color or monochrome; and
   when it is determined that the acquired block is color, generating a predetermined number of units of color components of a predetermined color format and performing a compression process using the predetermined number of units of the color components and a table for color image data, and when it is determined that the acquired block is monochrome, generating a predetermined number of units of one color component of the predetermined color format while dividing the acquired block, and performing a compression process using the generated units of the one color component and a table for monochrome image data;

wherein when it is determined that the acquired block is color and it is determined that a previously acquired block is color, the table for color image data is not switched to the table for monochrome image data, and when it is determined that the acquired block is monochrome and it is determined that the previously acquired block is monochrome, the table for monochrome image data is not switched to the table for color image data.

10. An image processing device comprising:

an acquiring section that sequentially selects a block to be compressed from among a plurality of blocks obtained by dividing image data and acquires the selected block;

a determining section that determines whether the acquired block is color or monochrome; and a compressing section that generates, when the determining section determines that the acquired block is color, a predetermined number of units of color components of a predetermined color format while a resolution of each of the units of the color components is reduced and performs a compression process using the generated units of the color components and a table for color image data, wherein the generated units represent all color components of the predetermined color format, and that generates, when the determining section determines that the acquired block is monochrome, a predetermined number of units of one color component of the predetermined color format by dividing the acquired block while a resolution of the units of the one color component is maintained and performs a compression process using the generated units of the one color component and a table for monochrome image data, wherein no units of other components of the predetermined color format are generated.

* * * * *